(12) United States Patent
Gomez

(10) Patent No.: US 6,864,805 B1
(45) Date of Patent: Mar. 8, 2005

(54) SURVEILLANCE SYSTEM FOR AIRCRAFT INTERIOR

(75) Inventor: Oscar Gomez, Pembroke Pines, FL (US)

(73) Assignee: L-3 Communications Corporation, Sarasota, FL (US)

( * ) Notice: Subject to any disclaimer, the term of this patent is extended or adjusted under 35 U.S.C. 154(b) by 0 days.

(21) Appl. No.: 10/253,279

(22) Filed: Sep. 24, 2002

(51) Int. Cl.[7] .............................................. G08B 21/00
(52) U.S. Cl. ...................... 340/945; 348/143; 348/148
(58) Field of Search .......................... 340/945; 348/143, 348/117, 148; 244/1 R

(56) References Cited

U.S. PATENT DOCUMENTS 5,144,661 A * 9/1992 Shamosh et al. ........... 348/143
6,366,311 B1 * 4/2002 Monroe ...................... 348/148
RE37,709 E * 5/2002 Dukek ........................ 348/148

* cited by examiner

Primary Examiner—John Tweel
(74) Attorney, Agent, or Firm—Malloy & Malloy, P.A.

(57) ABSTRACT

A surveillance system for monitoring activity within at least the cabin portion of the aircraft in order to alert the flight crew within the cockpit of any emergency activity including, but not limited to, highjacking or terrorist activity. A viewing assembly in the form of one or more cameras is disposed to selectively capture images throughout the aircraft cabin interior and deliver the captured image data to a display assembly observable by the flight crew. Activation of the system is accomplished by controlled operation of one or more portable, wireless transmitters and at least one receiver which is operationally connected to the viewing assembly and the display assembly.

31 Claims, 4 Drawing Sheets

SURVEILLANCE SYSTEM FOR AIRCRAFT INTERIOR

BACKGROUND OF THE INVENTION

1. Field of the Invention

This invention relates to a surveillance system for visually monitoring predetermined interior portions of an aircraft in order to inform the flight crew of any emergency activity including, but not limited to, highjack attempts by terrorists.

2. Description of the Related Art

Due to the increase in terrorist activity throughout the world and in particular the events surrounding the tragedy of Sep. 11, 2001 in New York City, security has become a subject of increasing concern. One area of particular importance relates to the travel industry which involves processing millions of people on a daily basis. Air travel has received particular scrutiny and is the subject of attempts to greatly increase security measures in order to avoid emergency situations of the type set forth above, resulting in the death of thousands of people.

It is recognized that security measures have been in place for many years at most major airports throughout the world. However, it is commonly recognized that the security procedures previously implemented vary in effectiveness from country to country and is dependent, at least in part, on equipment, personnel and authorizing authorities responsible for the safety of commercial airline travel. Until recently, there has been a steady increase in both passenger and freight traffic on commercial airlines. As such, both passenger and commercial aircraft have increasingly become the targets of terrorist activities. Previously known or recently attempted security procedures appear to concentrate on passengers and cargo prior to being in place on the aircraft as well as the flight conditions and aircraft performance parameters, once the plane is in route.

More specifically, global tracking systems are now in place to monitor the flight of an aircraft from the time of lift-off until the time of landing at its intended destination. Similarly, radar and navigational positioning systems are common place both on the aircraft and at ground tracking stations. In addition, the avionics equipment now required to be present on many commercial aircraft, including electronic monitoring and diagnostic equipment, is structured to operate in a manner which provides both the aircraft crew and the ground tracking personnel a more complete, accurate and up-dated information regarding the flight conditions of the aircraft. Moreover, flight recorders have long been incorporated as standard, required equipment on commercial airliners so as to provide, and maintain a record of each flight. The determination of any malfunction of the aircraft during an emergency situation is thereby facilitated.

More recent attempts to increase the safety of both passenger and cargo travel on commercial airlines has been directed to electronic surveillance not only of the aircraft but of associated facilities utilized to handle passenger and cargo traffic, store and maintain the aircraft and service the aircraft between consecutive flights. On a more sophisticated level, newly developed systems attempt to integrate procedures directed to providing physical, visual and/or audio surveillance as well as monitoring of the environmental security and the condition of the aircraft when not flying. Moreover, known security measures of the type set forth above attempt to overcome vulnerabilities associated with aircraft storage, servicing, as well as access to the aircraft during such periods and/or procedures. By way of example, many critical areas of the aircraft are left exposed, including the operative components associated with the aircraft, such as landing gear, engine housings, airfoil maneuvering components, fueling, etc.

However, one area which is currently being reviewed on a serious basis is recognized as having been neglected for an extended period. This area is the ability of the flight and/or cabin crew, as well as other authorized personnel which may be present on the aircraft, to monitor the activities occurring within the passenger cabin (and/or cargo area) of an aircraft. Of particular importance is the ability to allow the flight crew to observe unusual or emergency activities by passengers on board the aircraft. Emergency situations occur on an all too frequent basis, wherein one or more passengers cause a disruption in the normal in-flight procedures resulting in the flight crew declaring an emergency. Such situations arise from irrate or overly stressed passengers as well as those individuals intent on terrorist activities. Occurrence of such emergency conditions on board the aircraft sometimes continue for an extended period without the knowledge of the flight crew. This is further evidence of a lack of an effective means of communicating the occurrence of such activities to the flight crew or other individuals associated with the operation or safety of the aircraft.

Accordingly, there is a significant need for a surveillance system particularly structured to monitor the activities within predetermined portions of an aircraft such as, but not necessarily limited to, the passenger cabin. Such a preferred system should be operational to immediately inform the flight crew of any unusual or obviously dangerous situations occurring within the interior of the aircraft. Further, an improved aircraft surveillance system should allow an accurate and detailed monitoring of emergency events by one or more members of the flight crew within the segregated area of the cockpit without the knowledge that such activities are being monitored. Importantly, an improved surveillance system which overcomes the disadvantages and problems associated with known and/or recently implemented security measures, should be structurally and operationally designed to avoid any type of interference with the critical flight systems necessary for the safe and efficient operation of the aircraft.

SUMMARY OF THE INVENTION

The present invention is directed to a surveillance system for monitoring the activity at least within the passenger cabin of a commercial airline and, in certain preferred embodiments, possibly other interior portions of the aircraft. Generally speaking, the surveillance system of the present invention provides for any unusual, emergency or terrorist activities to be selectively communicated to the flight crew so that such activity can be visually monitored, evaluated and dealt with in a manner which best accomplishes the safety of the passengers and crew aboard the aircraft and the continued operation thereof. As will be explained in greater detail hereinafter, structural and operational features of the surveillance system of the present invention includes the ability to activate and operate the various components thereof in an operationally isolated manner. Interference with the critical flight systems necessary for the safe and continued operation of the aircraft is thereby eliminated.

More specifically, the surveillance system of the present invention comprises a viewing assembly including at least one but preferably two cameras strategically placed within the aircraft interior such that images of the majority of at least the passenger cabin can be captured. Further, positioning of the one or more cameras of the viewing assembly is such as to provide clear visual observation, when the cameras are activated, of an entry or access area to the cockpit. In addition, one or more primary access portals, used by passengers, may also be clearly observed.

The one or more cameras of the viewing assembly are operatively connected by electrical wiring/conduit defining at least a portion of a control assembly such that image data in the form of captured images is conveyed to the display assembly. As will be explained in greater detail hereinafter, the control assembly serves to interconnect the various operative assemblies and other components of the surveillance system of the present invention in a manner which provides operational isolation and assures non-interference with the critical flight systems associated with the operation of the aircraft.

Further, the display assembly preferably comprises at least one display monitor disposed within the cockpit area of the aircraft in a clear viewing range of one or all members of the flight crew. Moreover, the display assembly may include a plurality of display monitors each concurrently but independently operable through the provision of the aforementioned control assembly, wherein each display monitor is positioned for unimpeded observation by specific members of the flight crew, such as the captain/pilot and the first officer/co-pilot. Naturally, placement of each of a plurality of display monitors is not intended to be limited to preferred observation by only the aforementioned individuals of the flight crew.

Another feature of the surveillance system of the present invention comprises an activation assembly which, in a preferred embodiment, is structured to selectively activate operation of the entire system. More specifically, the one or more cameras associated with the viewing assembly may be normally maintained in an non-operative but "ready" mode. Similarly, the one or more display assemblies associated with the flight crew are not normally intended to be continuously operated in order that the flight crew is not necessarily distracted by a non-critical system of the aircraft. However, if in the judgement of the cabin crew and/or other authorized personnel, an event or passenger activity occurs which should be immediately reported to the flight crew, the activation assembly functions to immediately switch the one or more cameras of the viewing assembly to an operational mode so that visual images of the interior of the cabin may be captured.

Similarly, the one or more display monitors associated with the display assembly are either automatically activated upon the viewing assembly passing into the operational mode or an alert system or assembly may be made operational. The aforementioned alert system preferably comprises a signal device, such as a signal light disposed in a position within the cockpit which is clearly observable by the flight crew. The signal device may be in the form of a signal light, sounding device or both. Once the alert assembly signals that the viewing assembly has been activated, the flight crew is thereby made immediately aware that activities or events are occurring within the passenger cabin, or other portions of the aircraft interior, which should be visually monitored by the flight crew. As such, the one or more display monitors may be manually activated in order to provide clear observation of the images captured by the one or more cameras of the viewing assembly.

In at least one preferred embodiment, to be described in greater detail hereinafter, the activation assembly includes at least one receiver electrically connected at least to the viewing assembly and the one or more cameras thereof. In addition, the receiver may be electrically connected to both the display assembly and the alert assembly such that all of the operative components of the surveillance system may be concurrently switched to an operational mode. Another feature of at least one preferred embodiment of the present invention comprises the activation assembly including at least one but preferably a plurality of transmitters. The one or more transmitters are intended to be of compact, light weight construction and therefore portable. Further, the size, configuration, and overall structure of the one or more transmitters are such as to facilitate being mounted or supported on the person of one or more members of the cabin crew. Additionally, it is recognized that "air marshals" currently travel on commercial airlines. In such an event, one of the plurality of portable transported can also be assigned to an air marshal or other authorized personnel.

Additional features associated with the one or more transmitters is that they are structured to communicate with the receiver by wireless communication. Moreover, such wireless communication may comprise operation over a low level radio frequency band, preferably, but not necessarily in the range of 312 megahertz (MHz). Accordingly, the operational range of the one or more transmitters is at least 300 feet and well within the physical confines of the passenger cabin of even the largest commercial airliners. Due to the portable and wireless operational features of the one or more transmitters, they are intended to be variably spaced throughout the aircraft interior, relative to the receiver as they are mounted on and travel with members of the cabin crew or other authorized personnel.

Therefore, the surveillance system of the present invention efficiently and effectively serves to monitor the activity within at least the passenger cabin of a commercial aircraft, regardless of its size, type, model etc. Also operative components associated therewith are operationally isolated from the critical flight systems associated with the performance of the aircraft and are therefore structured to not interfere therewith.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

DETAILED DESCRIPTION OF THE PREFERRED EMBODIMENT

Figure 1:
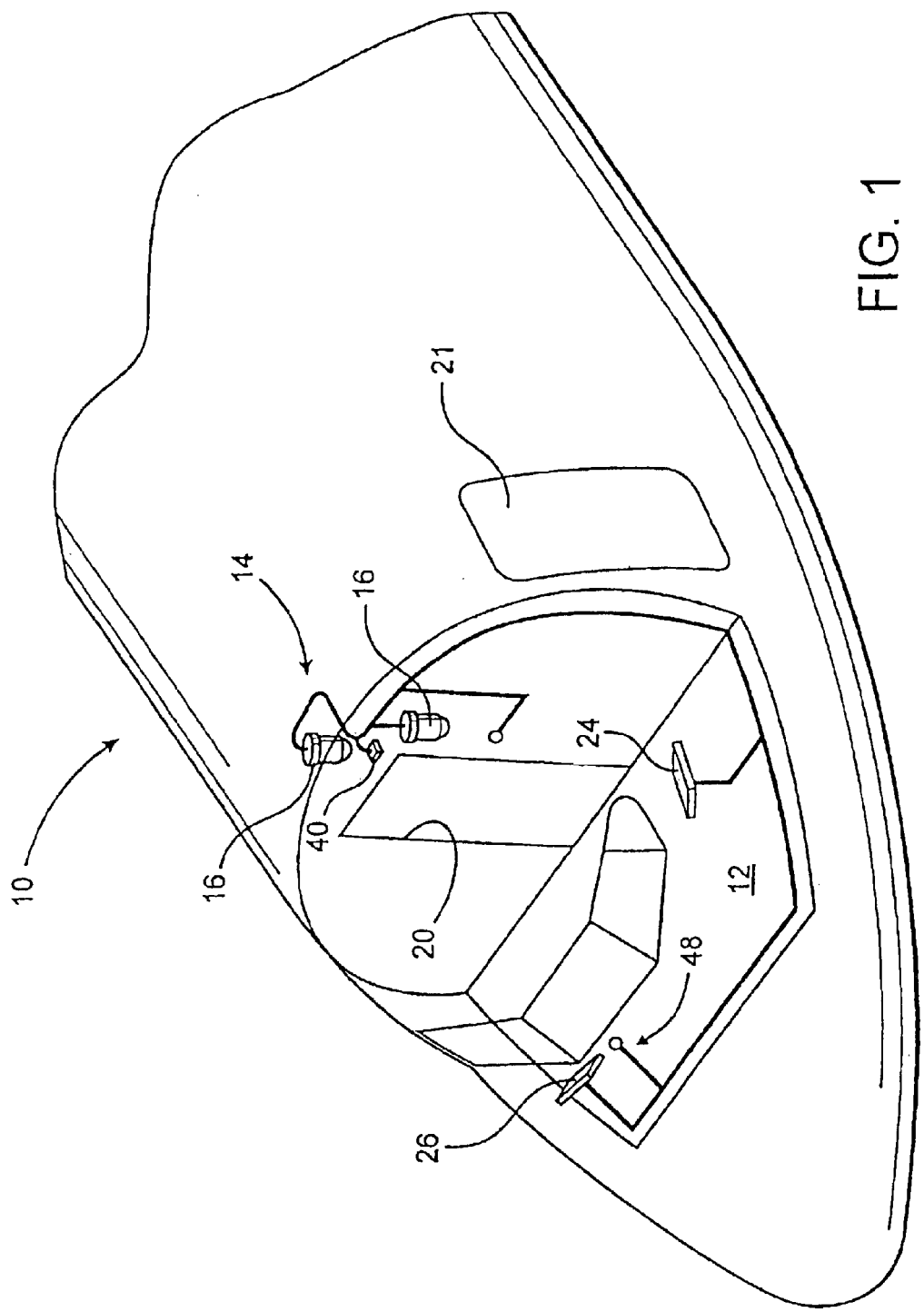
FIG. 1 is a schematic representation in perspective and partial cutaway showing the location of certain operational components of the surveillance system of the present invention on or within an aircraft.

As shown in the accompanying drawings, the present invention is directed to a surveillance system structured to provide visual monitoring of activities within predetermined portions of a commercial, or other aircraft, wherein the aircraft is schematically depicted in FIG. 1 as 10. FIG. 1 further shows an interior view of the cockpit of flight deck area 12 absent certain normal structures and features associated therewith, such as the seats for the flight crew, control panels and other operational equipment. The description of the surveillance system of the present invention may specifically relate to the aircraft 10 representing series of the DC 9 as well as all series of the MD80. However, it is emphasized that the subject surveillance system is readily adaptable for all commercial and private aircraft including those configured to transport passengers, freight/cargo or both. Accordingly, the surveillance system is structured to allow visual observation and monitoring of predetermined portions of the aircraft interior including, but not limited to, the passenger cabin, by the members of the flight crew located within the cockpit 12 without any member of the flight crew having to leave the flight deck.

Therefore, the subject surveillance system comprises a viewing assembly generally indicated as 14 and including at least one but preferably a plurality of cameras 16. As shown in both FIGS. 1 and 2 the plurality of cameras 16 are two in number. However, the surveillance system of the present invention is clearly operative with one such camera 16 or more than two of such cameras 16 located strategically throughout the predetermined portion of the aircraft interior being monitored, such as the passenger cabin 18. As demonstrated in FIGS. 1 and 2 both of the cameras 16 are secured to and depend from ceiling portions of the passenger cabin interior 18.

In addition, at least one of the cameras 16' may be located above and immediately adjacent the entrance or access area 20 to the flight deck or cockpit 12. In addition, another of the cameras as at 16" may be located substantially adjacent the cockpit entry 20 but more preferably adjacent the left ceiling area of the passenger cabin 18 normally in the vicinity of the forward galley compartment. As such, camera 16' provides a basically unrestricted view of the passenger cabin 18 and specifically the area in front of the cockpit entry 20. In cooperation therewith, camera 16" provides a clear view of any individual positioned adjacent a passenger entry door 21 as well as the area immediately in front of the cockpit entry 20.

In order to facilitate visual observation and image capturing during all flight conditions, each of the cameras 16 are specifically designed for aircraft application. As such each camera 16 may include a light sensor assembly (not shown for purposes of clarity) that senses and triggers an infrared source such as a light emitting diode (LED). The infrared source is activated at light levels which are determined to be below 0.3 lux. Accordingly even in total darkness of zero lux light level, the flight or cockpit crew will be able to visually monitor activities within the passenger cabin, or other predetermined portions of the aircraft interior, in black and white.

However, the light sensor assembly of the present invention is further structured to convey image data in the form of captured images to the flight crew, within the cockpit 12, in color when the determined light level is above 0.3 lux. Further operational characteristics of the camera 16 include a view angle of preferably of 78 degrees, while exceeding a 30 foot horizontal and vertical view which, as set forth above, may be accomplished in total darkness. In should be readily apparent that the one or more cameras 16 may be strategically disposed within predetermined portions of even the largest "wide body" airframe, therefore rendering the surveillance system of the present invention adaptable for use with any commercial airliner.

The subject surveillance system comprises a display assembly including at least one but preferably a plurality of monitors 24 and 26 disposed within the cockpit 12 in clear view of all or particular members of the flight crew. In the preferred embodiment of FIG. 3, display monitor 24 is located adjacent the position of the captain/pilot such that a clear feel of observation and access to the display monitor 24 is present. Similarly, display monitor 26 is located in accessible, observable relation to the first officer/co-pilot. It is emphasized that a single display monitor can be located within the cockpit 12 or alternatively a number of such display monitors 24 or 26 greater than two, dependent upon the size, configuration, etc. of the cockpit 12 and/or the number of individuals associated with the fligh crew.

Figure 4:
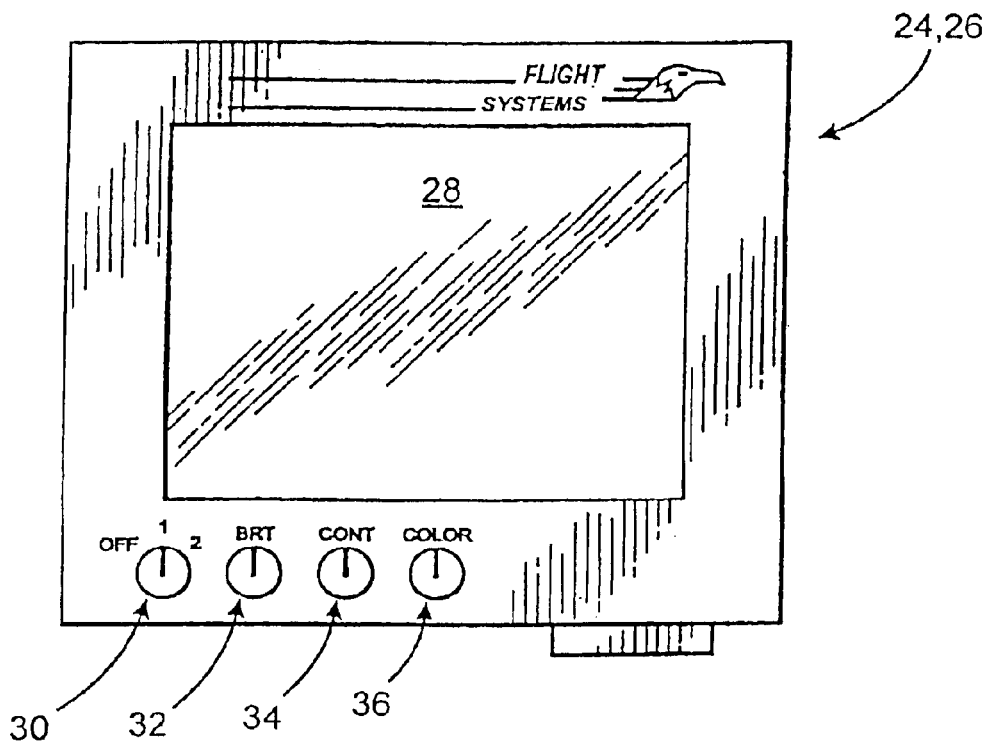
FIG. 4 is front plan view of a display monitor associated with the surveillance system of the present invention.

With primary reference to FIG. 4, each of the display monitors 24 or 26 discloses a display screen 28, which may be in the form of a liquid crystal display (LCD) or other appropriate structure capable of projecting images thereon in both black and white and color, as set forth above. Each of the display monitors 24 and 26 includes operational controls comprising a three position switch 30, brightness control 32, contrast control 34 and a color control 36. It should be apparent that operation of the display monitors 24 and 26 is not necessarily dependent on the manually operable controls 30, 32, 34 and 36 and that a greater or lesser number of such controls may be provided.

Yet another feature of the surveillance system of the present invention comprises an activation assembly. The activation assembly, in at least one preferred embodiment, is operational to be controlled by the one or more members of the cabin crew such as each of the one or more flight attendants and any other authorized personnel located within the passenger cabin or other portions of the aircraft interior. As such, the activation assembly is operative to selectively actuate the one or more cameras 16 of the viewing assembly and concurrently alert members of the cabin crew, located within the cockpit 12 that emergency or other activities within the passenger cabin 18 should be visually monitor.

Figure 5:
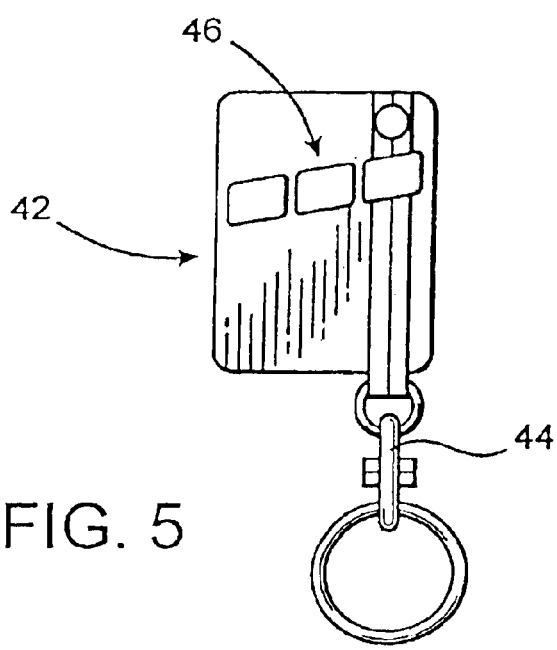
FIG. 5 is a detailed view of one of a possible plurality of transmitters associated with the surveillance system of the present invention.

More specifically, the activation assembly of the present invention comprises at least one receiver 40 located at anyone of a plurality of appropriate locations throughout the aircraft 10 such as, but not limited to, a position adjacent the camera 16 of the viewing assembly. The receiver 40 is structured to be responsive, by means of wireless communication with at least one but preferably a plurality of transmitters 42 shown in detail in FIG. 5. Each of the one or more transmitters 42 are of light weight, compact construction so as to be portable and therefore move throughout the interior portion of the aircraft 10, such as the passenger cabin 18 which is being monitored. As such, each of the one or more transmitters 14 may include a mounting or attachment assembly 44 designed to secure the individual transmitters 42 on the person/clothing of an individual flight attendant of the cabin crew or other authorize personnel, as set forth above. Further, each of the transmitters 42 include an activation switch or push/pull button 46 cooperatively structured with interior operational components of the plurality of transmitters 42 so as to generate and communicate, through wireless transmission, an activation signal to the receiver 40.

It is important to note that the structural and operational features of all of the components and assemblies, particularly including the activation assembly and the control assembly, to be described in greater detail hereinafter, are structured to be operationally isolated, meaning that their activation, operation, etc. will not interfere with the critical flight system associated with the operation and performance of the aircraft 10. Accordingly, wireless communication between the one or more transmitters 42 and the receiver 40 may be independent of one another and may operate on a low level radio frequency band of, by way of example, 312 Mhz. The portable nature of each of the transmitters 42 is such that they may be disposed, such as while being carried on the person of the flight attendant, at variably spaced distances from the receiver 40 and still be efficiently operative to activate the cameras 16 the monitors 24, 26 and/or a alert assembly generally indicated as 48 located within the cockpit or flight deck 12 of the aircraft 10.

Figure 2:
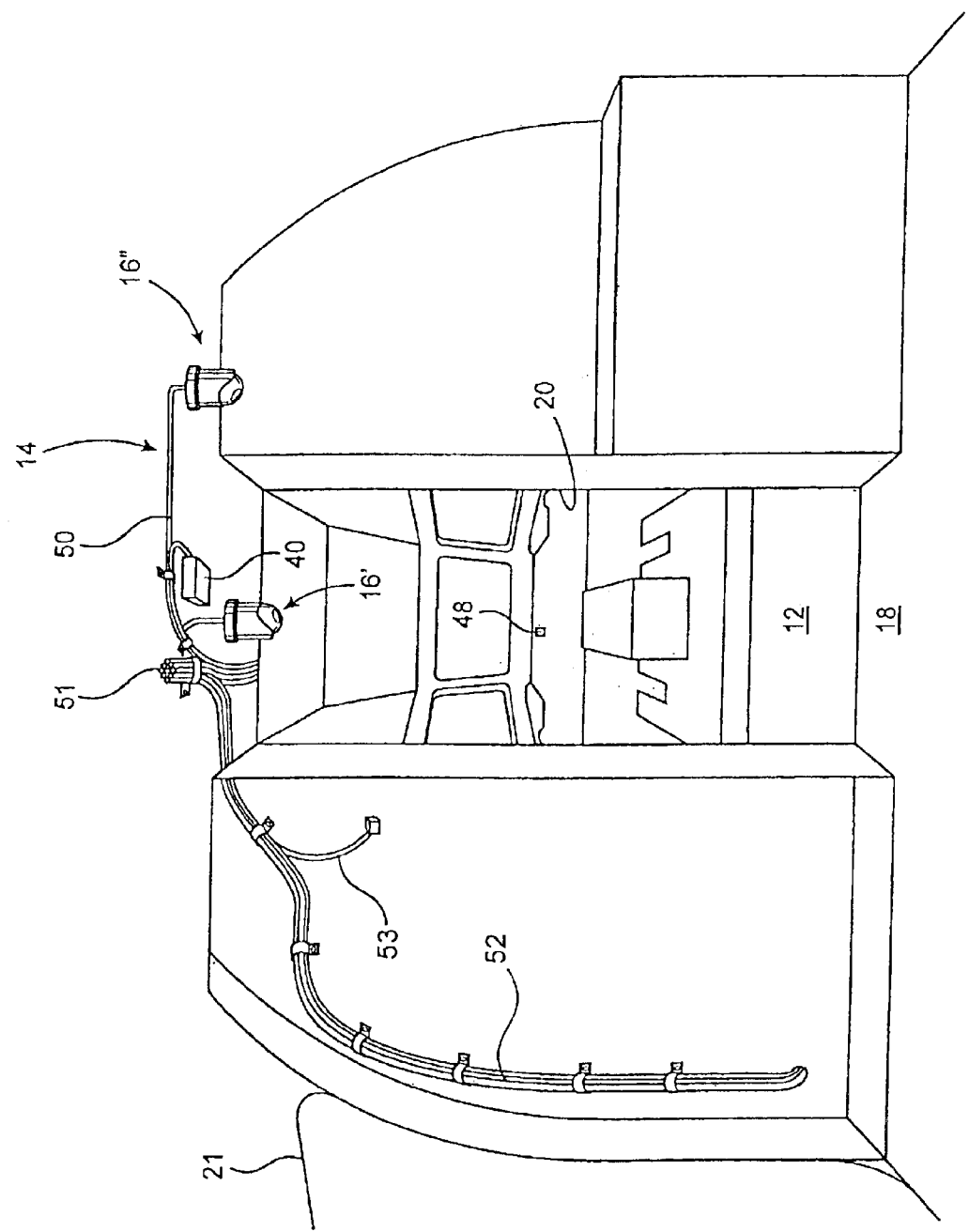
FIG. 2 is a schematic view in perspective and partial cutaway showing the various operative components of the surveillance system of the present invention and their relation to interior portions of the passenger cabin as well as the access area to the flight deck or cockpit.
Figure 3:
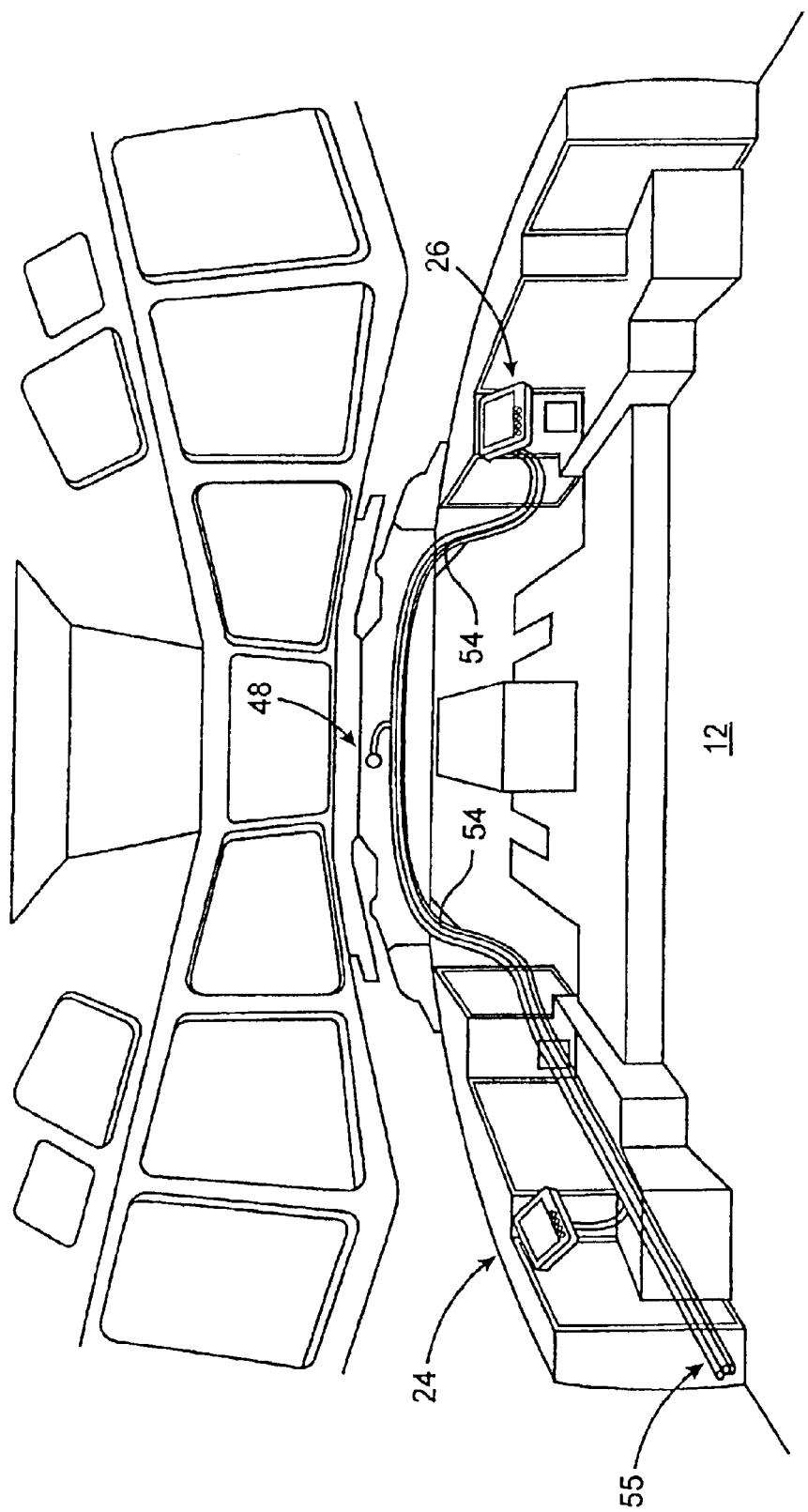
FIG. 3 is a schematic representation in perspective of the interior of the cockpit and location of certain operative components of the surveillance system of the present invention.

Further with reference to the alert assembly 48, at least one signal device such as a signal light and/or sounding device may be mounted as indicated in FIGS. 1 through 3 so as to be clearly observable and/or in communication with at least one, but preferably all of the numbers of the flight crew occupying the cockpit 12. In operation the occurrence of an emergency event worthy of being monitored by the flight crew within the cockpit 12 will determine activation of the surveillance system of the present invention as one or more individuals of the cabin crew manually depress, or otherwise manipulate, the activation switch or button 46. Depressing the activation button 46 for at least one second will cause an activation signal to be transmitted to the receiver 40. The receiver 40 is connected by the control assembly to the other operative components and assemblies defining the surveillance system of the present invention.

More specifically, the control assembly includes electrical conduit or other appropriate electrical harness structures 50, 52, 53, 54 and 55 preferably mounted on interior, non-observable portions of the airframe of the aircraft 10 as clearly demonstrated in FIGS. 2 and 3. Accordingly, the control assembly serves to interconnect the various operative components, as set forth herein, of the viewing assembly, activation assembly, and alert assembly. As set forth above, the control assembly, activation assembly and other operative components associated with the remainder of the surveillance system of the present invention are specifically structured to be operationally isolated from the critical flight systems of the aircraft so as to not interfere with operation therewith during flight or other performance of the aircraft.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A surveillance system for monitoring activity within an aircraft interior, said system comprising:
   a) a viewing assembly disposed within the aircraft interior and structured to monitor at least a predetermined portion thereof,
   b) a display assembly disposed within the aircraft interior in segregated relation to said viewing assembly,
   c) an activation assembly variably spaced at least in part from said viewing assembly and remotely operative to initiate observation of the aircraft interior,
   d) a control assembly interconnecting said viewing assembly, said display assembly and said activation assembly, and
   e) said control and activation assemblies structured to be operationally isolated from critical flight systems of the aircraft.

2. A surveillance system as recited in claim 1 wherein said activation assembly comprises at least one transmitter and at least one receiver cooperatively structured to selectively initiate operation of said viewing assembly.

3. A surveillance system as recited in claim 2 wherein said transmitter is remotely positionable within the aircraft interior in variably spaced relation to said transmitter.

4. A surveillance system as recited in claim 3 wherein said transmitter is structured for wireless communication with said receiver.

5. A surveillance system as recited in claim 3 wherein said transmitter comprises a portable, lightweight construction structured for removable support on the person of authorized personnel.

6. A surveillance system as recited in claim 5 wherein said transmitter is structured for wireless communication on a low level radio frequency band with said receiver.

7. A surveillance system as recited in claim 2 wherein said activation assembly comprises a plurality of transmitters each structured to independently communicate with said receiver.

8. A surveillance system as recited in claim 7 wherein at least some of said plurality of transmitters are portable and structured for wireless communication with said receiver.

9. A surveillance system as recited in claim 7 wherein said plurality of transmitters are structured for wireless communication on a low level radio frequency band with said receiver, said plurality of transmitters independently positionable relative to said receiver within the aircraft interior.

10. A surveillance system as recited in claim 1 wherein said viewing assembly comprises at least one camera disposed and structured to monitor at least a majority of a passenger cabin of the aircraft interior.

11. A surveillance system as recited in claim 10 wherein said camera is operatively responsive to activation assembly.

12. A surveillance system as recited in claim 2 wherein said viewing assembly comprises a plurality of cameras at least one of which is disposed to monitor aircraft interior portions adjacent a cockpit entry.

13. A surveillance system as recited in claim 12 wherein each of said plurality of cameras are responsive to said activation assembly and structured to deliver image data of different aircraft interior portions to said display assembly.

14. A surveillance system as recited in claim 13 wherein at least one of said plurality of cameras includes a light sensor assembly structured to facilitate image capture at a substantially zero lux light level.

15. A surveillance system as recited in claim 12 wherein said display assembly comprises at least one display monitor disposed within a viewing range of a flight crew, said display monitor structured to display images from each of said plurality of cameras.

16. A surveillance system for monitoring activity within an aircraft interior, said system comprising:
   a) a viewing assembly including at least one camera disposed and structured to visually monitor at least a predetermined portion of the aircraft interior, b) a display assembly including at least one display monitor disposed to be observable by a flight crew, c) at activation assembly including at least one receiver and at least one transmitter, said activation assembly structured to selectively activate said viewing assembly, d) a control assembly interconnecting said viewing assembly, said display assembly and said activation assembly for concurrent operation thereof, and e) at least said activation assembly and said control assembly are structured for non-interfering operation relative to critical flight systems of the aircraft.

17. A surveillance system as recited in claim 16 further comprising an alert assembly disposed in communicating relation to the flight crew, said alert assembly responsive to said activation assembly and structured to be indicative of activation of said viewing assembly.

18. A surveillance system as recited in claim 16 wherein said transmitter is portable and structured for wireless communication with said transceiver.

19. A surveillance system as recited in claim 18 wherein said plurality of transmitters are structured for wireless communication on a low level radio frequency band with said receiver, said plurality of transmitters independently positionable relative to said receiver within the aircraft interior.

20. A surveillance system as recited in claim 16 wherein said activation assembly comprises a plurality of transmitters independently positionable in variably spaced relation to said receiver within the aircraft interior.

21. A surveillance system as recited in claim 20 wherein at least some of said plurality of transmitters are portable and structured for wireless communication with said receiver.

22. A surveillance system as recited in claim 16 wherein said viewing assembly comprises a plurality of cameras responsive to said activation assembly and disposed and structured to deliver image data of different aircraft interior portions to said display assembly.

23. A surveillance system as recited in claim 22 wherein at least one of said plurality of cameras includes a light sensor assembly structured to facilitate image capture at a substantially zero lux light level.

24. A surveillance system as recited in claim 16 wherein said display assembly comprises a plurality of display monitors disposed within a viewing range of different members of a flight crew of the aircraft, said plurality of display monitors structured to display image data from each of said plurality of cameras.

25. A surveillance system for monitoring activity within an aircraft interior, said system comprising:

a) a viewing assembly comprising a plurality of cameras disposed and structured to monitor predetermined portions of the aircraft interior, b) a display assembly including at least one display monitor disposed to be observable by a flight crew, c) an activation assembly including at least one receiver and a plurality of transmitters, said activation assembly structured to selectively activate said viewing assembly, d) said plurality of transmitters independently positionable in variably spaced relation to said receiver within the aircraft interior, e) a control assembly interconnecting said viewing assembly, said display assembly and said activation assembly for concurrent operation thereof, and f) said activation assembly and said control assembly structured for non-interfering operation relative to critical flight systems of the aircraft.

26. A surveillance system as recited in claim 25 wherein said plurality of transmitters are structured for wireless communication on a low level radio frequency band with said receiver.

27. A surveillance system as recited in claim 25 wherein each of said plurality of cameras are responsive to said activation assembly and structured to deliver image data of different aircraft interior portions to said display assembly.

28. A surveillance system as recited in claim 27 wherein at least one of said plurality of cameras includes a light sensor assembly structured to facilitate image capture at a substantially zero lux light level.

29. A surveillance system as recited in claim 25 wherein said display assembly comprises a plurality of display monitors disposed within a viewing range of different members of the flight crew, said plurality of display monitors each structured to display images from each of said plurality of cameras.

30. A surveillance system as recited in claim 25 further comprising an alert assembly disposed in communicating relation to the flight crew, said alert assembly responsive to said activation assembly and structured to be indicative of activation of said viewing assembly.

31. A surveillance system as recited in claim 30 wherein said alert assembly comprises a signal light disposed within a cockpit of the aircraft.

* * * * *